A. G. McADIE.
PLANT PROTECTOR.
APPLICATION FILED JUNE 20, 1912.
1,047,138.
Patented Dec. 10, 1912.
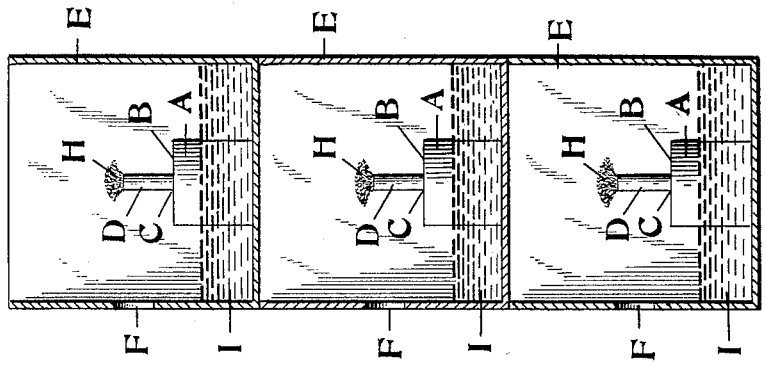
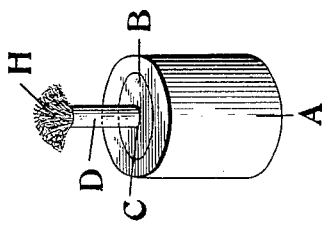
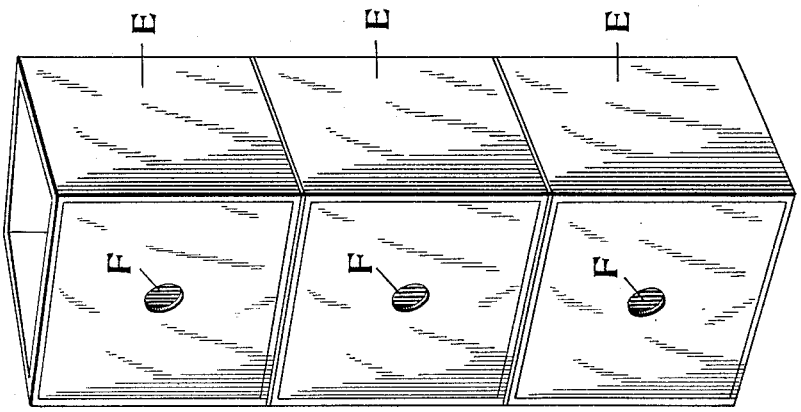

UNITED STATES PATENT OFFICE.

ALEXANDER GEORGE McADIE, OF SAN FRANCISCO, CALIFORNIA.

PLANT-PROTECTOR.

1,047,138.  Specification of Letters Patent.  Patented Dec. 10, 1912.

Application filed June 20, 1912. Serial No. 704,880.

(DEDICATED TO THE PUBLIC.)

*To all whom it may concern:*

Be it known that I, ALEXANDER G. McADIE, an employee of the Department of Agriculture of the United States of America, residing at San Francisco, California, (whose post-office address is San Francisco, California,) have invented a new and useful Plant-Protector.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to a combination burner and vaporizer for the protection of trees, bushes, vines, flowers, and other plants against injury from temperatures as low or lower than freezing; also from injury caused by rapidly rising temperature at sunrise and thereafter, when such vegetation has been exposed previously to the low temperatures described.

The object of my invention is to provide a cheap, available, and easily handled device, which by burning kerosene, stove distillate, or any lighter form of oil, is adapted to produce heat and raise the temperature of the air surrounding the fruit trees, plants, etc.

My invention is further adapted to provide means for introducing large quantities of water in the form of vapor and at a much higher temperature than the surrounding air. This vapor serves the double purpose of absorbing or entrapping the long heat waves radiated from the earth, and slowly reëmitting such heat, and by absorbing the solar energy at sunrise and later, thereby preventing a too rapid warming up or thawing out of the chilled plant tissue, plant juices, and plant water.

The nature, characteristic features, and scope of my invention will be more readily understood from the following description taken in connection with accompanying drawing, forming a part hereof, wherein, Figure 1 is a perspective view of one of the cans employed in my invention. Fig. 2 is a perspective view of my invention, and Fig. 3 is a vertical section of the invention in operative position.

Referring to the drawings, a number of cans A, preferably three in number, are employed in my invention as fuel holders. Each of said cans is provided with a removable top or cover, B. An opening, C, is cut in the top of the cover, B, for permitting the insertion of the burner or candle, D, in the can. The burner or candle, D, consists of a cardboard tube loosely packed with cotton waste. A tuft of cotton waste, H, projects from the end of the tube so that the whole constitutes a wick, thus drawing the oil contained in the can, by capillarity to the candle tip. I do not confine myself exclusively to the use of cans or receptacles having detachable tops as fuel holders, but any ordinary fruit can having a top in which an opening may be cut or formed therein for the insertion of the burner or candle, D, so that said candle may be supported in an upright position, may be employed for this purpose, as the use of a removable cover is unnecessary.

In each of the fuel holders, I pour 1½ pints, more or less, of kerosene or other light oil, and then place each of said fuel holders in a larger can or receptacle, E, having approximately five gallons capacity. The cans, E E E, are open at the top, and I pour in said cans about two quarts of water I for the purpose of producing vapor as hereinafter described. In the side of each of said receptacles, E, is cut an opening, F, used as an air hole for insuring combustion when my invention is in operation.

In practising my invention, I remove the top or cover, B, from the cans or fuel holders, and pour in said cans the necessary quantity of kerosene and then replace the cover. I then insert the candle or burner, D, in the opening, C, and light the same. This done, I place in each of the larger cans or receptacles, E, each containing approximately two quarts of water, one of the fuel holders, and then arrange said cans or receptacles, E, one on top of the other, thus making them unit sections as shown in Figs. 1 and 3 of the drawings. This entire arrangement forms a heating device and likewise a vaporizing device. The triple heating device is then placed under the fruit tree or plant requiring protection. The heat from the candle or burner, D, gradually warms up the metal of the cans, E, so much so, that in a brief period they become too warm to touch. In about 15 minutes, depending upon the quantity of water used, ebullition begins and vapor rises and flows out from opening F and the top of each can, E. Arranging the unit sections one upon the other when setting them in position for operation causes the triple device to become heated more quickly, and also aids in maintaining the heating temperature at a degree necessary to permit an adequate flow of vapor for the protection of the plants. This result is obtained due to the lower unit sections aiding in heating the upper sections.

In practice, I have ascertained that the candles, D, will burn up one pint of kerosene in seven hours. This rate will vary with the size of the candle. The size of the one preferably used in my invention is $1\frac{1}{2}$ inches in length, and about 1 inch in diameter. I have further found that by burning the heaters for seven hours and using 16 ounces of oil, the device will evaporate 150 ounces of water.

My triple heater device should be used in the orchard as near the tree as is consistent with safety, and the candles lighted when the temperature falls to 32°. Inasmuch as heated air weighs less than cold air, air from the vicinity of the burner will rise in the direction of the fruit, and inasmuch as water vapor has a lower specific gravity than air, it will also rise in the direction of the fruit or object to be protected. The heat from the burner or candle, D, warms up the entire unit sections, thus causing the series of receptacles to radiate heat and further causing the water contained therein to vaporize. The water with its high specific heat and the latent heat of the vapor arising therefrom are utilized for warming up the air surrounding the object to be protected. The vapor so developed further serves the purpose of absorbing the heat radiated from the earth, and in its ascension reëmits the heat so absorbed. The vapor thus obtained moves to the level of the fruit, and the metallic device when so heated also radiates heat to the level of the fruit or plants to be protected. The heat furnished from the sources mentioned warms up the air around the fruit or plant requiring protection, and overcomes injurious effects to the fruit or plant due to frost or low temperatures by retarding a fall in temperature during the night hours, or by retarding a too rapid rise in temperature at sunrise, thereby preventing unduly rapid expansion of cell tissue, juices, and water when subjected to the heat of the rising sun after low temperature.

Having thus described my invention, I claim:

1. A plant protector, comprising a plurality of superimposed receptacles, each open at the top and having an air vent and adapted to contain water, and a plurality of oil burners, one located in each of said receptacles, each of said oil burners consisting of an oil containing receptacle and a candle supported in said receptacle.

2. A plant protector comprising a plurality of superimposed receptacles, each provided with an opening and adapted to hold water, and a plurality of oil burners, one for each of said receptacles, each burner adapted to be supported in the water of its respective receptacle and to heat the receptacle next above and to vaporize the water therein.

In testimony whereof I affix my signature in the presence of two subscribing witnesses.

ALEXANDER GEORGE McADIE.

Witnesses:
  WILLIAM J. REED,
  WALTER H. SCHOLL.

Copies of this patent may be obtained for five cents each, by addressing the "Commissioner of Patents, Washington, D. C."